June 25, 1957     P. MERCURY     2,796,902
CHOPPING BOARD
Filed Aug. 31, 1956
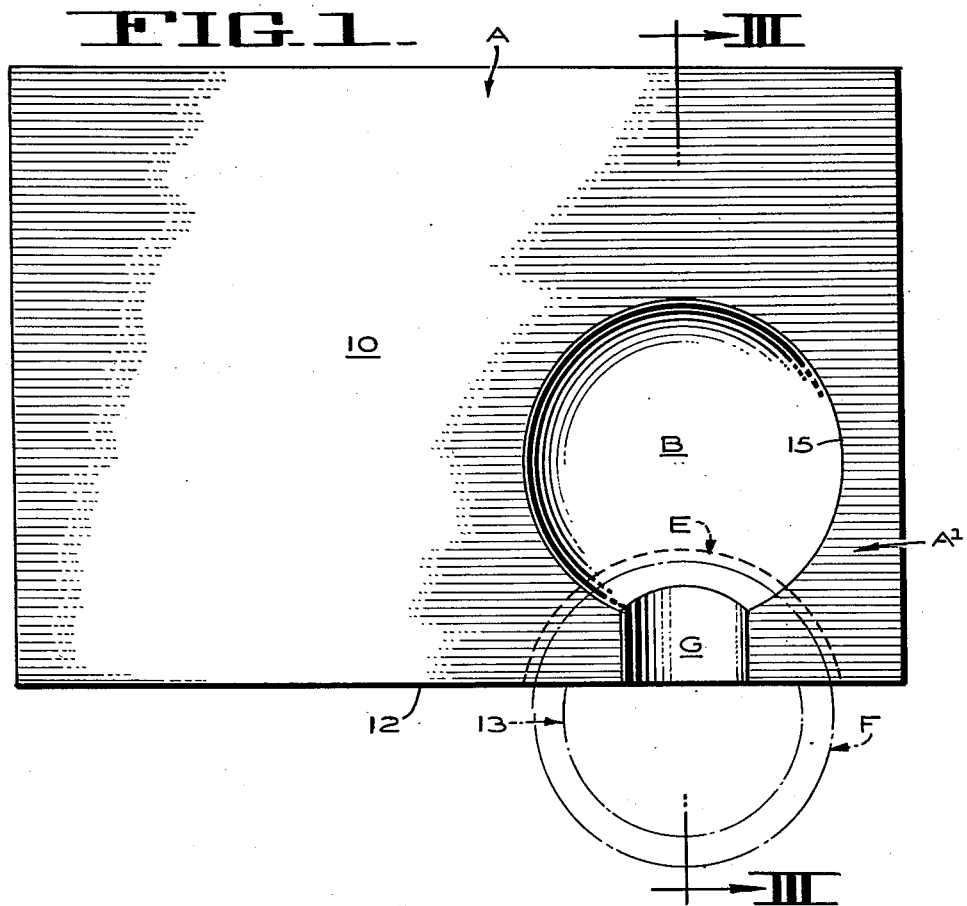
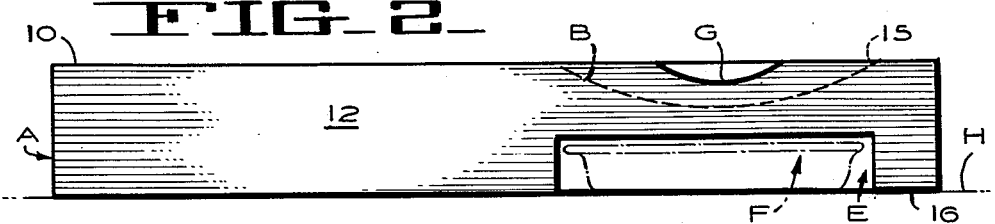
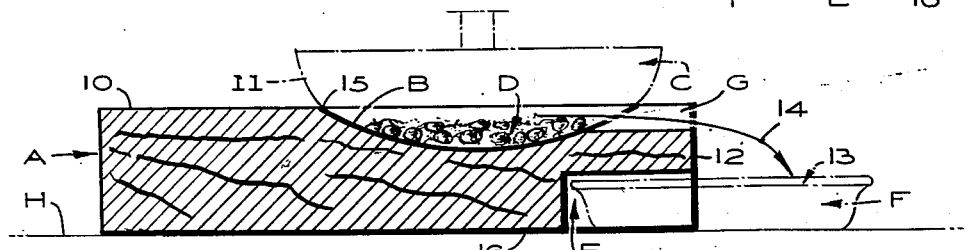
INVENTOR
PEARL MERCURY
BY Munn & Liddy
ATTORNEYS

2,796,902
CHOPPING BOARD

Pearl Mercury, Modesto, Calif.

Application August 31, 1956, Serial No. 607,426

5 Claims. (Cl. 146—215)

The present invention relates to improvements in a chopping board. It consists of the combinations, constructions and arrangement of parts, as hereinafter described and claimed.

It is proposed in this invention to provide a chopping board, which is so constructed that various articles of food may be readily chopped thereon to the desired degree of fineness, and then conveniently transferred to a dish.

More specifically stated, the upper surface of the chopping board is provided with a saucer-shaped depression in which articles of food may be chopped. The board is fashioned with an undercut recess in an edge thereof into which a dish may be partially inserted. Also, the board is made with a transferring groove in its upper surface, which is so arranged that the chopped food may be easily transferred therethrough from the depression to the dish.

As a still further object, it is proposed to confine the depression, groove and recess to a corner portion of the board, thereby leaving the remainder of the board unobstructed for coarse chopping. The coarsely-chopped particles of food may be readily pushed into the depression for finer chopping thereof.

Other objects and advantages will appear as the specification continues. The novel features will be set forth in the claims appended hereunto.

Drawing

For a better understanding of the invention, reference should be had to the accompanying drawing, forming part of this specification, in which:

Figure 1 is a top plan view of my chopping board;

Figure 2 is a front elevational view thereof; and

Figure 3 is a transverse sectional view taken along the line III—III of Figure 1.

While I have shown only the preferred form of my invention, it should be understood that various changes, or modifications, may be made within the scope of the annexed claims without departing from the spirit thereof.

Detailed description

In carrying my invention into practice, I provide a chopping board indicated generally at A, which has an upper surface 10 fashioned with a saucer-shaped depression B therein. This depression has been disclosed as being concaved, defining a segment of a sphere, thus conforming to the curved blade edges 11 of a conventional chopping knife C (see Figure 3). It will be apparent that the depression B is designed to hold articles of food D so that the latter may be chopped into fine particles.

Moreover, the board A has an edge 12 fashioned with an undercut recess E into which a dish F may be partially inserted, with a portion 13 of the dish projecting beyond the edge 12. Also, the board has a transferring groove G in its upper surface, which is disposed above the recess E and leads from the depression B to the edge 12, whereby the chopped articles of food D may be moved from the depression B and along the groove G for dropping directly into the projecting portion 13 of the dish F as suggested by the arrow 14 (see Figure 3).

As shown in Figures 1 to 3, inclusive, the depression B has its rim 15 disposed flush with the upper surface 10 of the board, whereby coarsely-chopped particles of food on this surface may be pushed into the depression B for finer chopping thereof.

This chopping board has been illustrated as being rectangular in outline, although I do not desire to be limited in this respect. As clearly shown in Figure 1, the depression B, groove G and recess E are confined to a corner portion $A^1$ of the board, thereby leaving the remainder of the upper surface 10 unobstructed for coarse chopping of the articles of food.

The recess E extends upwardly from an underneath surface 16 of the board. This arrangement will facilitate the cleaning of the recess when the board is inverted. Obviously, the dish F may be supported on a table H, or the like, upon which the board is placed.

I claim:

1. A chopping board having an upper surface provided with a saucer-shaped depression in which articles of food may be chopped; the board having an edge fashioned with an undercut recess into which a dish may be partially inserted, with a portion of the dish projecting beyond said edge; the board having a transferring groove in its upper surface, which is disposed above said recess and leads from the depression to said edge of the board, whereby chopped articles of food may be moved from the depression and along the groove for dropping directly into the projecting portion of the dish.

2. The chopping board, as defined in claim 1; and in which the saucer-shaped depression has a rim disposed flush with the upper surface of the chopping board, whereby coarsely-chopped particles of food on said upper surface may be pushed from this surface into the depression for finer chopping thereof.

3. The chopping board, as defined in claim 1; and in which the depression, groove and recess, are confined to a corner portion of the board, thereby leaving the remainder of the upper surface of the board unobstructed for coarse chopping of the articles of food.

4. The chopping board, as defined in claim 1; and in which the recess extends upwardly from an underneath surface of the board to facilitate the celaning of the recess when the board is inverted.

5. A chopping board having an upper surface provided with a saucer-shaped depression in which articles of food may be chopped; the board having an edge fashioned with an undercut recess into which a dish may be partially inserted, with a portion of the dish projecting beyond said edge; the board having a transferring groove in its upper surface, which is disposed above said recess and leads from the depression to said edge of the board, whereby chopped articles of food may be moved from the depression and along the groove for dropping directly into the projecting portion of the dish; the saucer-shaped depression having a rim disposed flush with the upper surface of the chopping board, whereby coarsely-chopped particles of food may be pushed from this surface into the depression for finer chopping thereof; the depression, groove and recess being confined to a corner portion of the board, thereby leaving the remainder of the upper surface of the board unobstructed for coarse chopping of the articles of food; the recess extending upwardly from an underneath surface of the board to facilitate the cleaning of the recess when the board is inverted.

No references cited.